United States Patent [19]

Isono et al.

[11] Patent Number: 4,580,966

[45] Date of Patent: Apr. 8, 1986

[54] ORIENTATION PROCESSING DEVICE FOR MAGNETIC PARTICLES ON DISC-SHAPED MAGNETIC RECORDING MEDIUM

[75] Inventors: Hiromasa Isono, Atsugi; Hiroshi Teramoto, Yokohama; Masanobu Shimizu, Ebina, all of Japan

[73] Assignee: Victor Company of Japan, Limited, Kanagawa, Japan

[21] Appl. No.: 614,913

[22] Filed: May 29, 1984

[30] Foreign Application Priority Data

Jun. 2, 1983 [JP] Japan ................................ 58-98470

[51] Int. Cl.$^4$ ............................................ B29C 71/00
[52] U.S. Cl. ..................................... 425/174; 118/623; 118/640; 335/284; 335/302; 360/86; 360/135
[58] Field of Search ............. 425/174, 174.8 E, 174.4; 264/108; 118/620, 623, 640; 427/127, 128, 130, 132; 360/135, 134, 86; 335/302, 284

[56] References Cited

U.S. PATENT DOCUMENTS

| | | | |
|---|---|---|---|
| 2,711,901 | 6/1955 | von Behren | 360/134 |
| 2,903,329 | 9/1959 | Weber | 335/302 |
| 3,514,768 | 5/1970 | Hagadorn et al. | 360/120 |
| 4,003,336 | 1/1977 | Koester et al. | 360/134 |
| 4,043,297 | 8/1977 | Hartmann et al. | 118/640 |
| 4,087,843 | 5/1978 | Louis et al. | 360/135 |
| 4,131,921 | 12/1978 | Gruczelak | 360/86 |
| 4,189,508 | 2/1980 | Chiba et al. | 427/128 |
| 4,217,612 | 8/1980 | Matla et al. | 360/135 |

Primary Examiner—Willard E. Hoag
Attorney, Agent, or Firm—Jordan and Hamburg

[57] ABSTRACT

A device for orienting magnetic particles contained in a magnetic layer on a disc-shaped magnetic recording medium along the circumference of the recording medium. The magnetic layer is provided on a substrate. The orientation is effected by a magnetic field developed by a pair of permanent magnets and which the recording medium traverses during rotation. The permanent magnets are individually shaped flat and arranged to oppose each other at their pole-faces which are common in polarity. A trailing edge of each magnet located with respect to relative movement of the rotating recording medium extends and aligns with the radius of the recording medium.

7 Claims, 8 Drawing Figures

ORIENTATION PROCESSING DEVICE FOR MAGNETIC PARTICLES ON DISC-SHAPED MAGNETIC RECORDING MEDIUM

BACKGROUND OF THE INVENTION

The present invention relates to a device for orienting magnetic particles distributed in a magnetic layer which constitutes a disc-shaped magnetic recording medium.

A magnetic recording medium is generally made up of a substrate, or support, made of nonmagnetic material and a magnetic layer or layers deposited on the substrate. For the fabrication of such a medium, it has been customary to move a magnetic recording medium through an orienting magnetic field while the magnetic layer is still wet, so that magnetic particles distributed in the magnetic layer may be oriented by the magnetic field. A magnetic tape, which is one typical form of magnetic recording media, is oriented in the longitudinal direction thereof, as well known in the art.

Another typical form of magnetic recording media is a disc available as a magnetic disc fabricated by applying magnetic layers to a substrate which is made of aluminum or like nonmagnetic metal, or a flexible disc, or floppy disc, fabricated by applying magnetic layers to a thin flexible substrate made of polyethylene terephthalate. In such a recording disc, tracks are provided in a format of concentric circles or in a spiral and, therefore, orienting the disc in the same manner as the tape, i.e. one straight direction, would limit the recording and playback sensitivity of the disc and, thereby, lower the playback output level or render it unstable. While an attempt has been made to produce a nonoriented magnetic recording disc in order to cope with the above problem, such a disc has naturally attained only poor recording and playback characteristics due to a low recording and playback sensitivity.

Orientation, therefore, is a requisite for magnetic discs as well as for magnetic tapes and it is highly desirable that magnetic particles are oriented along the circumference of a disc. In other words, the orientation at every radius of the disc is preferred to the tangential to the circumference of the disc. With prior art devices for orienting magnetic particles in a magnetic disc, there have remained difficulties in achieving accurate orientation of the magnetic particles in the circumferential direction of a disc.

SUMMARY OF THE INVENTION

It is therefore an object of the present invention to provide an orientation processing device for magnetic particles on a disc-shaped magnetic recording medium which is capable of orienting magnetic particles accurately along the circumference of a recording medium.

It is another object of the present invention to provide a generally improved orientation processing device for magnetic particles on a disc-shaped magnetic recording medium.

An orientation processing device for a disc-shaped magnetic recording medium of the present invention orients along a circumference of a recording medium magnetic particles distributed in a magnetic layer which is provided on a nonmagnetic substrate constituting the recording medium. The device comprises a rotary drive unit for driving the recording medium in a rotary motion, and a pair of permanent magnets arranged to face each other across a single air gap at pole-faces thereof which are common in polarity. The permanent magnets develop in the air gap a magnetic field for orienting the magnetic particles when the recording medium is rotated by the rotary drive unit and is continuously passing through the air gap. Each of the permanent magnets is shaped such that a trailing edge thereof with respect to of the rotating extends and aligns with a radial direction of the recording medium. The trailing edge defines most the final orientation of the magnetic particles in the process.

The above and other objects, features and advantages of the present invention will become apparent from the following detailed description taken with the accompanying drawings.

DESCRIPTION OF THE PREFERRED EMBODIMENTS

While the orientation processing device for magnetic particles on a disc-shaped magnetic recording medium of the present invention is susceptible of numerous physical embodiments, depending upon the environment and requirements of use, substantial numbers of the herein shown and described embodiments have been made, tested and used, and all have performed in an eminently satisfactory manner.

To facilitate understanding of the present invention, a brief reference will be made to a prior art orientation processing device for magnetic particles on a disc-shaped magnetic recording medium, shown in FIGS. 1 and 2.

Figure 1:
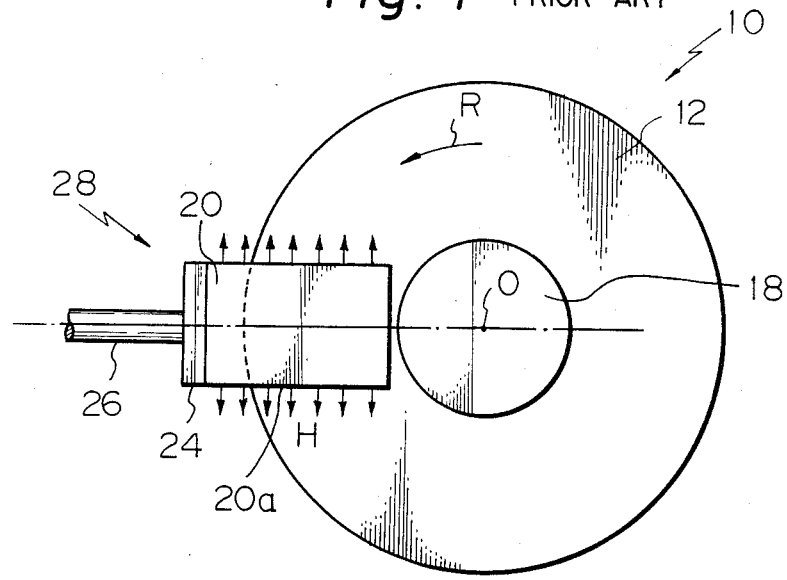
FIGS. 1 and 2 are respectively a plan view and a side elevational view of a prior art orientation processing device for magnetic particles on a disc-shaped magnetic recording medium.
Figure 2:
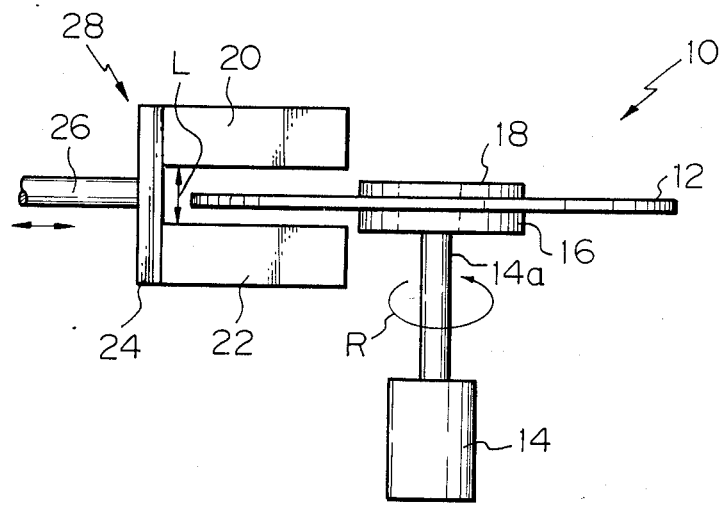

Referring to FIGS. 1 and 2, the prior art orientation processing device is generally designated by the reference numeral 10. A disc-shaped magnetic recording medium 12 comprises a nonmagnetic substrate, or support, and a magnetic layer or layers provided on the substrate. The medium, or disc, 12 is loaded on a rotary drive unit of the device 10 with the magnetic layer thereof undried. The rotary drive unit for the disc 12 comprises a motor 14, a turntable 16, and a clamp member 18 for detachably fixing the disc 12 to the turntable 16. The disc 12 is caused into rotation while being securely mounted on the turntable by the clamp member 18. The device 10 further includes a pair of permanent magnets 20 and 22 which are rigidly retained by a nonmagnetic holder 24 with an air gap L defined therebetween and such that their pole-faces common in polarity oppose each other. The permanent magnets 20 and 22, the holder 24 and the like constitute in combination an orientation processing unit, generally designated 28. The orientation processing unit 28 is connected by a support rod 26 to a carrier mechanism (not shown) which is adapted to move the unit 28 to an operative position adjacent to the disc 12 as shown in FIG. 2 or to an inoperative position remote from the operative position. The magnets 20 and 22 opposing each other at their common pole-faces are individually provided with a rectangular horizontal section. The orientation processing unit 28 in the operative position is located such that the centerline of each permanent magnet 20 or 22 extends in a radial direction of the disc 12.

In operation, as the disc 12 is rotated by the drive unit of the device 10 as indicated by an arrow R, the still wet magnetic layer deposited thereon moves through an orientating magnetic field which is developed by the orientation processing unit 28. As a result, magnetic particles distributed in the magnetic layer on the disc 12 are oriented by that part H of the magnetic field which is located at the trailing side of the magnets with respect to the direction of rotation of the disc 12. The magnetic layer is subsequently, but before removing the magnets, dried to settle solid.

The problem with the above-described prior art device 10 is that since the magnetic field H developed by the orientation processing unit 28, i.e. magnets 20 and 22, perpendicularly to an edge 20a of the magnet 20 in FIG. 1 is not strictly directed along the circumference of the disc 12 and, therefore, fails to accurately orient the magnetic particles on the disc 12 in the circumferential direction.

Some preferred embodiments of an orientation processing device in accordance with the present invention will be described in detail with reference to FIGS. 3-8.

Figure 8:
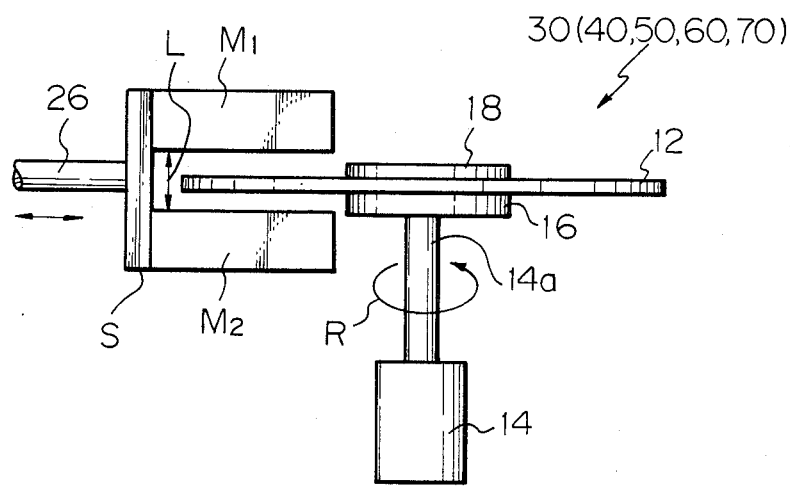
FIG. 8 is a side elevation of any of the arrangements shown in FIGS. 3-7.

In FIGS. 3-8, orientation processing devices 30, 40, 50, 60 and 70 each embodying the present invention are shown in plan views. FIG. 8 is a side elevation of any of the orientation processing devices 30, 40, 50, 60 and 70 in accordance with the present invention. In the device 30, 40, 50, 60 or 70, structural elements corresponding to those shown in FIGS. 1 and 2 are designated by like reference numerals for simplicity.

Again, the disc 12 having a magnetic layer provided on a nonmagnetic substrate is loaded on a rotary drive unit while the magnetic layer is still wet. The drive unit comprises a motor 14 having an output shaft 14a, a turntable 16, and a clamp member 18 for detachably fixing the disc 12 to the turntable 16. The disc 12 is rotatable fixed in place on the turntable 18 by the clamp member 18. In each of the embodiments shown in FIGS. 3-8, permanent magnets $M_1$ and $M_2$ are rigidly retained by a nonmagnetic holder member S with an air gap L defined therebetween and such that their pole-faces common in polarity oppose each other. The magnets $M_1$ and $M_2$ in combination with the holder S constitute an orientation processing unit 32, 42, 52, 62 or 72. A support rod 26 links the orientation processing unit 32, 42, 52, 62 or 72 to a carrier mechanism (not shown) which functions to move the orientation processing unit to an operative position shown in FIG. 8 or to an inoperative position remote from the operative position. The permanent magnets $M_1$ and $M_2$ included in any of the orientation processing units individually have a plan view such as shown in FIGS. 3-7.

Figure 3:
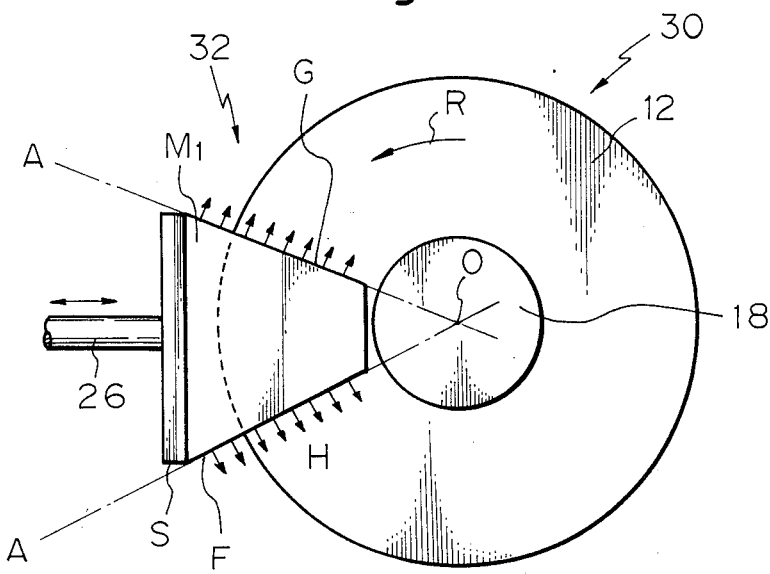
FIGS. 3-7 are plan views respectively showing different embodiments of an orientation processing device in accordance with the present invention.
Figure 4:
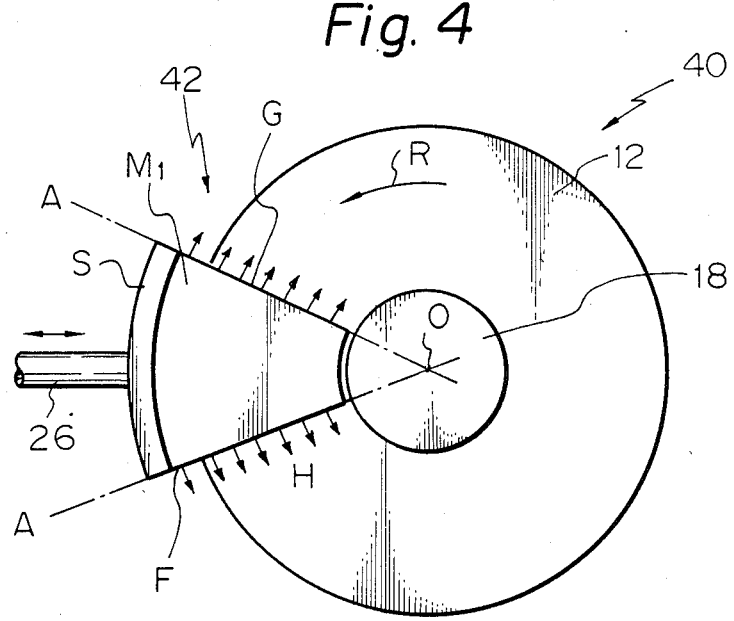
Figure 5:
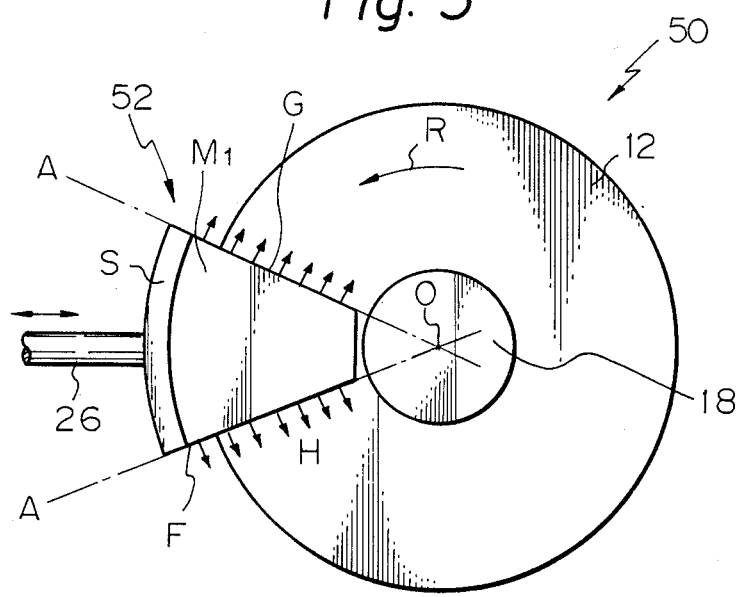
Figure 6:
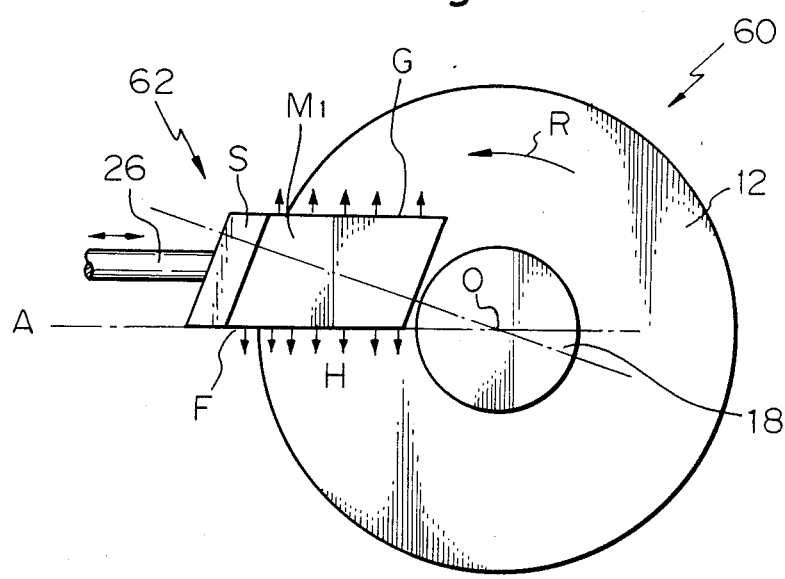
Figure 7:
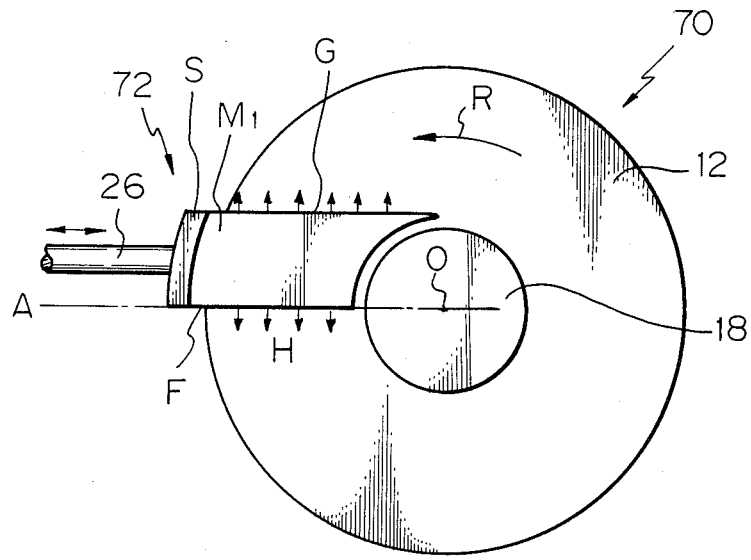

In accordance with a characteristic feature of the present invention, although the permanent magnets $M_1$ and $M_2$ are somewhat different in a plan view from one to another of the orientation processing units 32, 42, 52, 62 and 72, they are equally arranged such that an imaginary extension of aligned edges F of the magnets $M_1$ and $M_2$ at the trailing side with respect to the direction of rotation R of the disc 12 is substantially aligned with a radial direction of the disc 12, i.e. direction O-A shown in FIGS. 3-7. As far as the embodiments of FIGS. 3-5 are concerned, an extension of aligned edges G of the magnets $M_1$ and $M_2$ at the other or leading side with respect to the direction R is also substantially aligned with the radial direction O-A. Meanwhile, in the orientation processing unit 62 or 72 shown in FIG. 6 or 7, the extension of the aligned edges F of the magnets at the trailing side with respect to the direction R is substantially aligned with the radial direction O-A of the disc, while the extension of the edges G at the other or leading side extends in a direction other than the radial direction O-A. Such a magnet configuration is found to result a substantially uniform magnetic energy distribution along the radial direction of the disc 12.

The plan views of the permanent magnets $M_1$ and $M_2$ in accordance with the present invention shown in FIGS. 3-7 are not limitative and any other desired ones may be utilized. In any of the orientation processing devies 30, 40, 50, 60 and 70 in accordance with the present invention, when the disc 12 is rotated in the direction R, the still wet magnetic layer thereof advances through an orienting magnetic field developed in the unit 32, 42, 52, 62 or 72 by the magnets $M_1$ and $M_2$. In the meantime, magnetic particles on the disc 12 are consecutively oriented by the part H of the magnetic field which develops at the trailing side with respect to the direction R. The magnetic layer is then dried to fix without removing the magnets. In the device 30, 40, 50, 60 or 70, since the orienting magnetic field H which is perpendicular to the direction of aligned edges F of the magnets $M_1$ and $M_2$ in FIGS. 3-8 is substantially aligned along the circumferential direction of the disc 12, it is capable of orienting the magnetic particles on the disc 12 in a desirable manner along the circumferential direction of the disc 12. Preferably, such an orienting procedure should be repeated until the magnetic layer on the disc 12 becomes substantially dried and solid.

In summary, it will be seen that the present invention provides an orientation processing device which succeeds in composing an orientation of magnetic particles in a magnetic layer on a discshaped magnetic recording medium along the circumference of the medium in a desirable manner, thereby realizing a disc with excellent recording and playback sensitivity. This performance is derived from a unique arrangement wherein an orientation of the magnetic field developed at the trailing edge area perpendicularly to edges of the magnets, is substantially aligned tangentially to the circumference of the disc.

Various modifications will become possible for those skilled in the art after receiving the teachings of the present disclosure without departing from the scope thereof.

What is claimed is:

1. An orientation processing device for a discshaped magnetic recording medium which orients along a circumference of a recording medium magnetic particles distributed in a magnetic layer which is provided on a non-magnetic substrate constituting the recording medium, said orientation processing device comprising:
   (a) rotary turntable for supporting a recording medium drive means for driving the turntable in a rotary motion; and
   (b) a pair of permanent magnet arranged to face each other across a single air gap at pole-faces thereof which are common in polarity, said permanent magnets developing in said air gap magnetic field for orienting the magnetic particles when the recording medium is rotated by the rotary drive means and said field is continuously passing through the air gap, each of the permanent magnets being shaped such that a trailing edge of the permanent magnet extends and is aligned with a radius of said turntable.

2. An orientation processing device as claimed in claim 1, in which each of the permanent magnets is shaped such that a leading edge of the permanent magnet relative movement of the rotatable turntable being aligned with a central axis of the turntable and with a radius of the turntable.

3. An orientation processing device as claimed in claim 1, in which each of the permanent magnets is shaped such that a leading edge of the permanent magnet is approximately parallel to the trailing side.

4. An orientation processing device as claimed in claim 1, further comprising holder means for holding the permanent magnets integrally so as to constitute the air gap.

5. An orientation processing device as claimed in claim 4, in which the holder means comprises a flat member which extends perpendicular to the radius of the recording medium and the turntable.

6. An orientation processing device as claimed in claim 4, in which the holder means comprises an arcuate member which extends along and concentrically with the circumference of the recording medium.

7. An orientation processing device as claimed in claim 4, further comprising permanent magnet drive means for driving the holder means such that the recording medium partially and relatively enter into and exit from said air gap.

* * * * *